UNITED STATES PATENT OFFICE.

WARREN W. SPAULDING, OF WATERVILLE, MAINE.

MEDICAL COMPOUND.

SPECIFICATION forming part of Letters Patent No. 565,125, dated August 4, 1896.

Application filed February 7, 1896. Serial No. 578,451. (No specimens.)

*To all whom it may concern:*

Be it known that I, WARREN W. SPAULDING, a citizen of the United States, residing at Waterville, in Kennebec county and State of Maine, have invented a new and useful Composition of Matter to be Used for Removing the Appetite or Thirst for Intoxicating Liquors, of which the following is a specification.

My composition consists of two preparations.

The first one consists of the four following ingredients: first, pure water, eighteen gallons; second, crypto gamma, or *Allosoris cryspus*, commonly called "rock-brake," two ounces; third, heart of hornbeam-tree, or *Carpinus americana*, fifty pounds; fourth, *Sanguinaria canadensis*, (bloodroot,) one ounce. These four ingredients are to be heated together in a copper kettle and kept at the boiling-point of water for six consecutive hours. The liquor is then to be drawn off and filtered, after which it is ready for bottling.

The proper dose of the mixture is a wineglassful every two hours so long as any craving for liquor remains, or until the appetite ceases. The intervals may be increased.

The bloodroot may be omitted from a second infusion, prepared as before, to be used after the appetite seems to have disappeared, and this will tend to prevent its recurrence and produce wholesome sleep. This second infusion is to be used after being done with the first preparation and its purpose is to prevent the recurrence of said appetite and to produce wholesome sleep.

By the use of the aforesaid compound the appetite or thirst for intoxicating liquors is destroyed and the unnatural condition of the stomach caused by the excessive use of such liquors is overcome, so that there will be no craving for such liquor left.

What I claim, and desire Letters Patent of the United States for, is—

The herein-described composition of matter to be used in destroying and overcoming the habit or appetite for drinking intoxicating liquors to excess, said composition consisting of water, crypto gamma, or *Allosoris cryspus*, commonly called "rock-brake," the heart of the hornbeam-tree, or *Carpinus americana* and *Sanguinaria canadensis*, commonly called "bloodroot," in the proportions herein specified.

WARREN W. SPAULDING.

Witnesses:
FRANK E. BROWN,
W. W. BROWN.